(12) United States Patent
Rosen

(10) Patent No.: US 8,161,757 B2
(45) Date of Patent: Apr. 24, 2012

(54) PROCESSES AND MEANS FOR REDUCING THE INTENSITY OF TROPICAL CYCLONES

(75) Inventor: Alfred Rosen, Palm Beach, FL (US)

(73) Assignees: Robert M. Rosen, Edwards, CO (US); David B. Rosen, Lexington, MA (US)

( * ) Notice: Subject to any disclaimer, the term of this patent is extended or adjusted under 35 U.S.C. 154(b) by 614 days.

(21) Appl. No.: 12/141,161

(22) Filed: Jun. 18, 2008

(65) Prior Publication Data
US 2009/0014549 A1    Jan. 15, 2009

Related U.S. Application Data

(60) Provisional application No. 60/958,777, filed on Jul. 9, 2007.

(51) Int. Cl.
*B63B 35/00* (2006.01)

(52) U.S. Cl. ............. 62/74; 62/240; 114/264; 114/382; 405/130; 405/195.1; 210/170.11; 239/14.2

(58) Field of Classification Search ................ 60/641.6, 60/641.7; 210/138, 170.11, 747; 239/2.1, 239/2.2, 14.1, 14.2; 114/144 R, 244, 264–267, 114/382; 440/1, 2, 8–10; 441/1–3; 405/130, 405/195.1, 217; 62/74, 300–303, 240
See application file for complete search history.

(56) References Cited

U.S. PATENT DOCUMENTS

| | | | |
|---|---|---|---|
| 2,698,431 A | 12/1954 | Bielinski | |
| 2,903,188 A * | 9/1959 | Hutchinson | 239/2.1 |
| 3,762,176 A * | 10/1973 | Coggins, Jr. | 62/74 |
| 4,356,094 A * | 10/1982 | Ross | 210/774 |
| 4,399,040 A * | 8/1983 | Ayers et al. | 210/749 |
| 4,523,879 A * | 6/1985 | Finucane et al. | 405/217 |
| 4,699,545 A * | 10/1987 | Chen et al. | 405/217 |
| 5,035,541 A * | 7/1991 | Gulati et al. | 405/217 |
| 5,173,182 A * | 12/1992 | Debellian | 210/170.04 |

(Continued)

FOREIGN PATENT DOCUMENTS

JP          11-171094      *   6/1999

(Continued)

OTHER PUBLICATIONS

Thesis by William Chapman, Captain, USAF, "Developing Prediction Regions for a Time Series Model for Hurricane Forecasting", Thesis presented to the Faculty of the Graduate School of Engineering of the Air Force Institute of Technology, Approved for public release, Dec. 1993, downloaded from the Internet Sep. 9, 2011.*

(Continued)

*Primary Examiner* — Joseph Drodge
(74) *Attorney, Agent, or Firm* — Nixon Peabody LLP

(57) ABSTRACT

A navigable vessel for use in reducing the intensity of a tropical cyclone having an eye located over an ocean comprises a plurality of artificial snow-making devices aboard the vessel, at least one pump coupled to the devices and accessible to a body of water in which the vessel is floating for supplying the devices with water for making artificial snow, and a power source coupled to the devices to operate the devices in concert for producing a substantially uninterrupted supply of artificial snow. The artificial snow-making devices have discharge nozzles oriented to project the artificial snow away from the vessel onto or above the water adjacent the vessel.

3 Claims, 2 Drawing Sheets

U.S. PATENT DOCUMENTS

| | | | |
|---|---|---|---|
| 5,556,029 A | 9/1996 | Griese | |
| 5,753,108 A * | 5/1998 | Haynes et al. | 210/122 |
| 6,315,213 B1 | 11/2001 | Cordani | |
| 6,684,648 B2 | 2/2004 | Faqih | 62/93 |
| 6,845,919 B1 | 1/2005 | Hogue | |
| 7,536,967 B2 * | 5/2009 | Barber | 114/144 R |
| 2002/0008155 A1 | 1/2002 | Uram | |
| 2003/0085296 A1 | 5/2003 | Waxmanski | |
| 2003/0173414 A1 | 9/2003 | Herpay | |
| 2005/0133612 A1 | 6/2005 | Uram | |
| 2006/0018719 A1 * | 1/2006 | Stern | 405/217 |
| 2007/0114298 A1 | 5/2007 | O'Keefe | 239/2.1 |
| 2007/0158449 A1 * | 7/2007 | Hoffmann et al. | 239/2.1 |
| 2007/0257126 A1 * | 11/2007 | Vondracek | 239/2.1 |
| 2007/0270057 A1 * | 11/2007 | Feldman et al. | 441/1 |
| 2008/0175669 A1 | 7/2008 | Kleysen | 405/52 |
| 2008/0175728 A1 * | 7/2008 | Kithil | 417/331 |
| 2009/0008468 A1 | 1/2009 | Skukan | 239/2.1 |
| 2009/0028776 A1 * | 1/2009 | Osegovic et al. | 423/437.1 |
| 2009/0173386 A1 | 7/2009 | Bowers et al. | 137/1 |
| 2009/0173404 A1 | 7/2009 | Bowers et al. | 137/561 R |
| 2009/0173801 A1 | 7/2009 | Bowers et al. | 239/14.1 |
| 2009/0175685 A1 | 7/2009 | Bowers et al. | 405/52 |
| 2009/0177569 A1 | 7/2009 | Bowers et al. | 705/35 |

FOREIGN PATENT DOCUMENTS

| | | |
|---|---|---|
| WO | WO 2006/085830 | 8/2006 |

OTHER PUBLICATIONS

EAST Derwent Abstract of JP 11-171094, downloaded on Dec. 2, 2011.*

* cited by examiner

PROCESSES AND MEANS FOR REDUCING THE INTENSITY OF TROPICAL CYCLONES

CROSS-REFERENCE TO RELATED APPLICATIONS

This application claims priority to U.S. Provisional Application Ser. No. 60/958,777 filed Jul. 9, 2007.

BACKGROUND OF THE INVENTION

This invention teaches to use artificial snow to suppress moisture rising from warm surface water into storm clouds that are capable of producing tropical cyclones, aided if desired by the use of subsurface water to lower the temperature of surface water below the temperature that favors the production of tropical cyclones. An embodiment of the invention is disclosed in the drawings that accompany this application and the description of those drawings that follows. A ship that facilitates the use, maintenance and uninterrupted operation of snow-making and water delivery equipment under storm-at-sea conditions is disclosed.

SUMMARY OF THE INVENTION

In one embodiment, a navigable vessel for use in reducing the intensity of a tropical cyclone having an eye located over an ocean comprises a plurality of artificial snow-making devices aboard the vessel, at least one pump coupled to the devices and accessible to a body of water in which the vessel is floating for supplying the devices with water for making artificial snow, and a power source coupled to the devices to operate the devices in concert for producing a substantially uninterrupted supply of artificial snow. The artificial snow-making devices have discharge nozzles oriented to project the artificial snow away from the vessel onto or above the water adjacent the vessel. In one implementation, multiple vessels equipped with artificial snow-making devices are positioned in a region of the ocean directly beneath the eye, and multiple streams of artificial snow are directed onto or above the ocean water located directly beneath the eye of the cyclone.

In another embodiment, the intensity of a tropical cyclone having an eye located over an ocean with water vapor formed above the ocean water located directly beneath the eye is reduced by producing at least one stream of artificial snow and directing said stream into the water vapor above the ocean water located directly beneath the eye. In one implementation, multiple streams of artificial snow are directed onto or above the ocean water located directly beneath the eye of the cyclone.

BRIEF DESCRIPTION OF THE DRAWINGS

The invention will be better understood from the following description of preferred embodiments together with reference to the accompanying drawings, in which.

DETAILED DESCRIPTION OF ILLUSTRATED EMBODIMENT

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
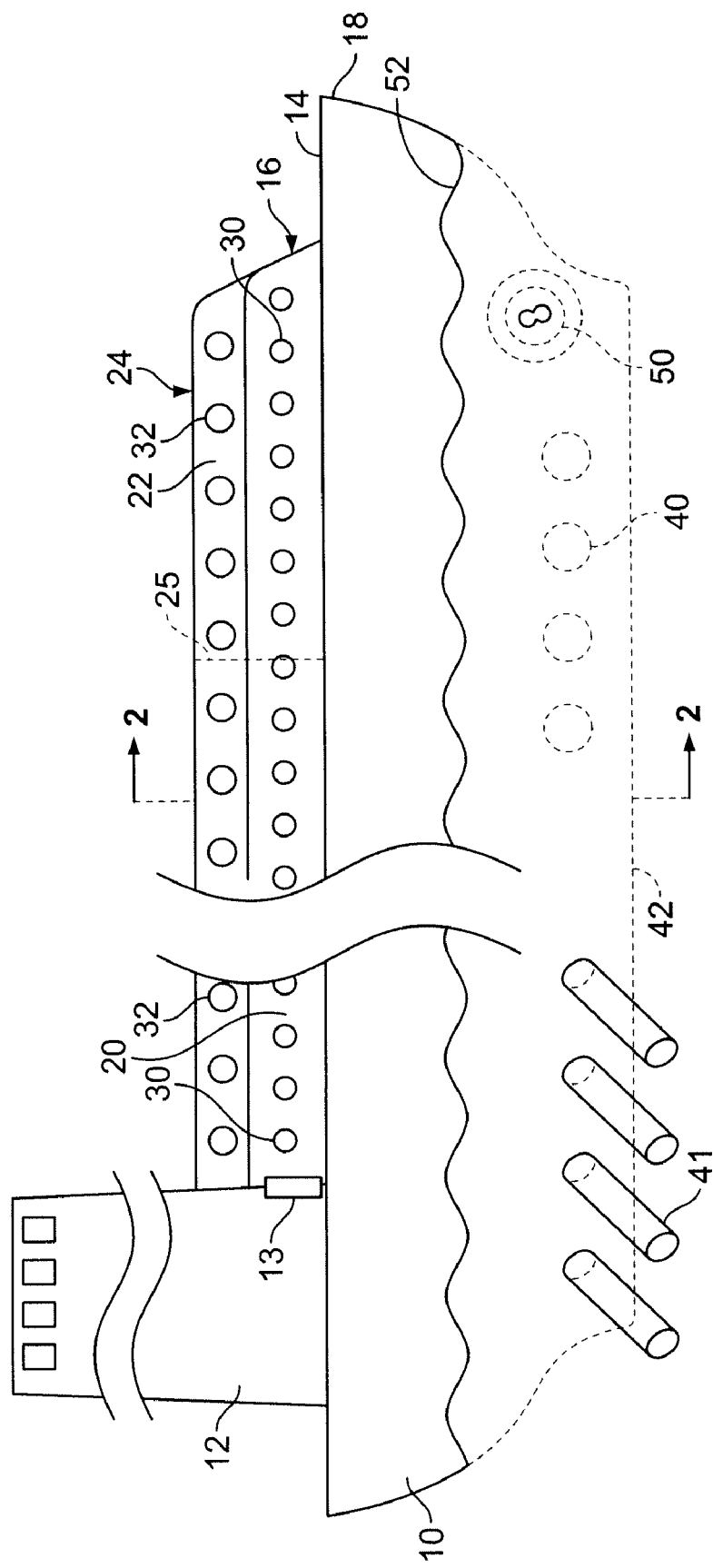
FIG. 1 is a side view of a ship designed to practice the invention.
Figure 2:
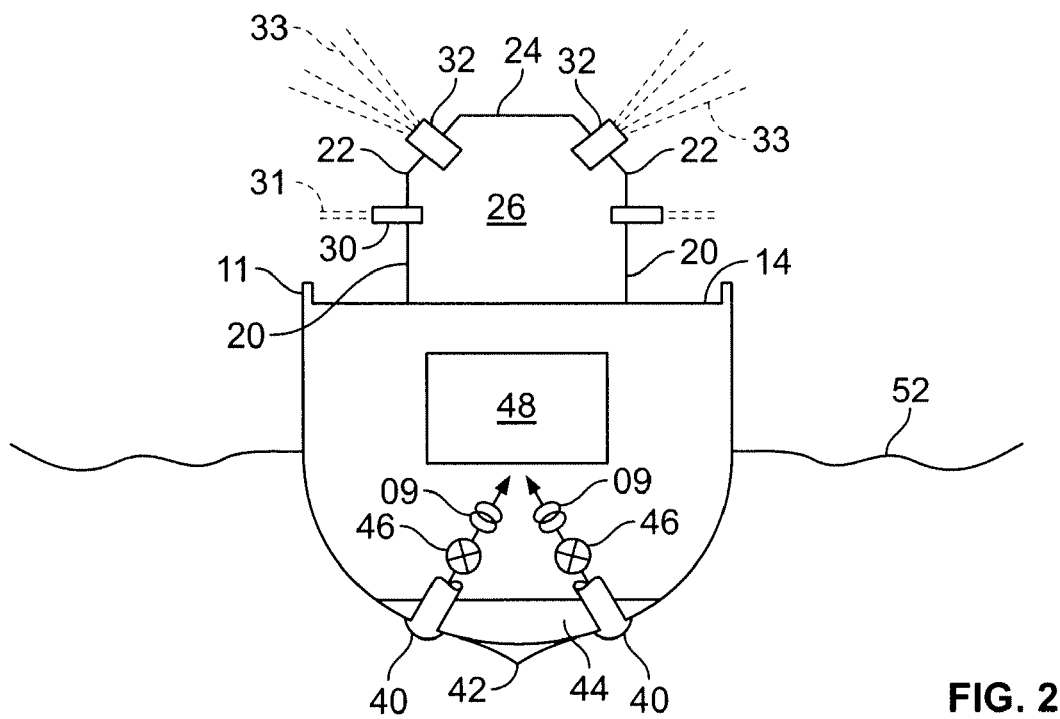
FIG. 2 is a section on line 2-2 in FIG. 1.

In FIGS. 1 and 2 the ship has a hull 10 resembling that of a typical oil tanker, with the bridge, navigation and living spaces in a tower 12 located aft. The main deck 14 supports a superstructure 16 extending from the tower forward toward the bow 18. As seen best in FIG. 2 the superstructure 16 has sidewalls 20 extending substantially vertically from the main deck, followed by inwardly-sloping walls 22 extending upwardly, capped by a substantially horizontal roof wall 24 completing an enclosure for interior space 26. Water nozzles are fixed in and extend through the sidewalls 20 in an array extending the full length of each sidewall. Snow makers 32 are fixed in and extend through the sloping walls 22 in an array extending the full length of each sloping wall. Screened water intakes 40 are fitted in the hull underwater on either side of the keel 42 and extending through the double-bottom 44. Each water intake is fitted with a control valve 46 and a water pump 09. Water intakes 40 extend in arrays along the forward portion of the hull on each side of the keel 42. Water outlets 41 extend along the aft portion of the hull on each side of the keel. Refrigeration equipment 48 is contained within the hull below the main deck 14. A transverse thruster 50 is fitted through the hull below the water line 52. In FIG. 2 a typical snow-maker pattern 33 is shown at each snow maker 32, and a typical water stream pattern 31 is shown at each water nozzle 30. The water nozzles 30 are located in the sidewalls 20 at a level that is above the main deck rails 11, so that the water streams will clear the rails.

Figure 3:
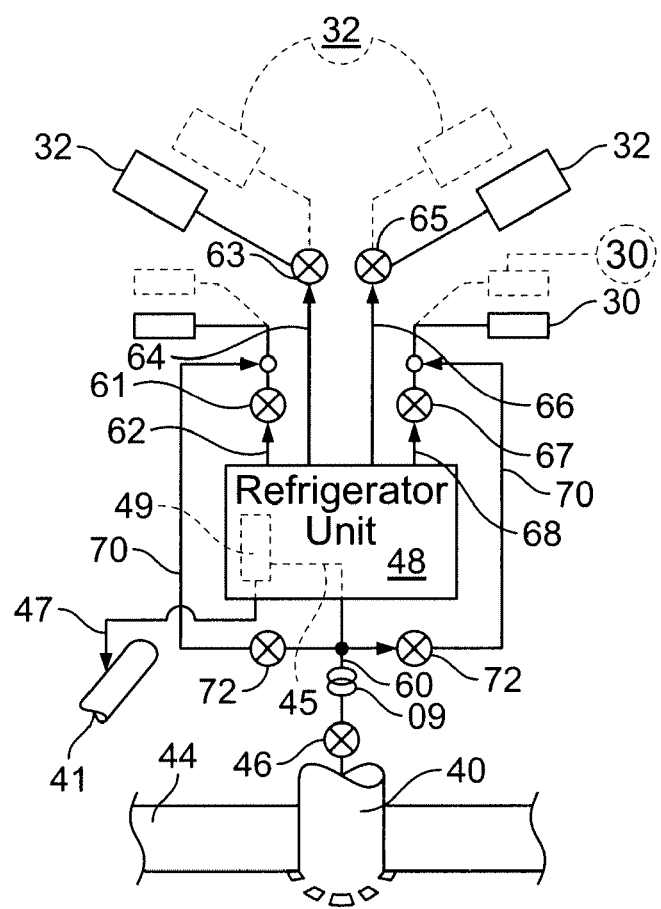
FIG. 3 is an operational schematic showing suggested connections among the elements shown in FIGS. 1 and 2.

In FIG. 3 a line 60 extends from the control valve 46 to the refrigerator unit 48. Four output lines 62, 64, 66 and 68 extend from the refrigerator unit to each of the water nozzles 30 and the snow makers 32, individually. Each output line is fitted with a control valve 61, 63, 65 and 67, respectively. As thus far described the system will provide refrigerated water to all of the water nozzles and snow makers on the ship. There may be several refrigerator units, and each unit may service several snow makers 32 and water nozzles 30, as is suggested in FIG. 3. If desired, the water nozzles 30 may be fed water directly from the water intakes 40 via by-pass lines 70. The bypass lines connect to the line 60 from the control valve 46 through valves 72, respectively. To use the bypass lines 70 valves 72 are opened and valves 61, 67 are closed.

Each refrigerator unit 48 includes a heat exchanger 49. Within the unit 48 some of the intake water is diverted via a line 45 to the heat exchanger and through the heat exchanger to an outlet 41, for removing accumulated heat from the refrigerator unit. The outlets 41 are directed aft and downward to direct the heated water downward toward colder regions of the ocean water behind the ship.

In the process of making artificial snow the snow makers 32 extract latent heat of fusion from the water that is supplied to them. The artificial snow, in turn, extracts heat from the moisture into which it is sprayed by the snow makers. The heat that would otherwise be available to support cyclonic action is thereby diminished. Since snow makers as heretofore used are operated in a cold environment the invention provides water to the snow makers 32 that is refrigerated to a temperature low enough for the snow makers to produce artificial snow. On the other hand, since the surface-water temperature must exceed a known value in order that a cyclone may evolve, it may not be necessary to refrigerate the water that is sprayed on the surface to inhibit formation of a cyclone. The invention provides an option to refrigerate or not refrigerate that water.

Although it is not intended to limit this invention to any specific theory of operation, it is believed to be likely that initially, when the artificial snow is sprayed into the water vapor it will lower the temperature and with it the vapor pressure at a cost not exceeding one calorie per gram (assuming that the water vapor will have a specific heat not greater than that of liquid water), and that cooling of the water vapor will proceed toward the freezing point, where the vapor pressure will approach a vanishing value. This alone will deprive the cyclone of the driving force which it would otherwise derive from an uninterrupted rising volume of warm water vapor that condenses in the upper atmosphere. Should this expected scenario fail to materialize, or be insufficient to reduce the intensity of the cyclone, the invention provides the resources to condense the water vapor into liquid state, by continued application of artificial snow, and, separately, by applying cooling water from the water nozzles 30 to cool the surface water.

To gain maximum effectiveness the ship must hold station in the eye of a cyclone. This requirement limits the speed of advance to the speed at which the storm is advancing, which may be a very low speed. It is difficult for ships to maintain a desired heading when advancing at very low speeds because the rudder loses control at very low speeds. The bow thruster 50 is useful to compensate for this loss of control.

The interior space 26 within the superstructure 16 provides a gallery in which the water feed lines and valves shown in FIG. 3 can be supported, along with all necessary electrical and other support systems. The systems may include the electric motors and compressed air facilities that are normally supplied with snow making nozzles. Crewmembers who operate and maintain the equipment can be stationed in this gallery, safe from external hostile weather elements. A watertight door 13 is provided between the tower 12 and the gallery space 26, giving crewmembers access to the gallery that does not require going out of protected space. The enclosed gallery space 26 allows service pipes and electrical conductors to be passed through the main deck 14 within the enclosed space; there is no need to perforate the main deck outside of that space. Watertight integrity can be enhanced by providing one or more bulkheads 25 across the gallery space; such bulkheads, if provided, will include watertight doors (not shown).

As used herein, the term 'artificial snow' includes any solid form of water regardless of whether it is an ice crystal or an ice particle and regardless of whether it is in the form of single crystals or particles or an agglomeration of multiple crystals or particles.

It is contemplated that in use a plurality of ships will be deployed in the water beneath the cyclonic eye to cooperate in the effort to deprive the cyclone of its driving force.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A navigable vessel operable for moving over an ocean, said vessel comprising
   a plurality of artificial snow-making devices aboard said vessel, at least one pump coupled to said devices and accessible to a body of water in which said vessel is floating for supplying said devices with water for making artificial snow,
   a power source coupled to said devices to operate said devices in concert for producing a substantially uninterrupted supply of artificial snow, and
   a walled structure having at least a roofwall and sidewalls substantially extending from stern to stern and enclosing a gallery providing a workspace shielded from external weather extending substantially from stem to stem, said devices being fixed in and through at least one of the sidewalls of said gallery, said devices having discharge nozzles oriented to project said artificial snow away from said vessel onto or above the water adjacent said vessel.

2. A floating navigable vessel operable for moving over an ocean, said vessel armed with a plurality of devices for making artificial snow arrayed in a closely spaced pattern extending substantially from stem to stern and connected to control means for operating said devices in concert so as to produce a substantially uninterrupted supply of artificial snow, said devices being oriented to project said artificial snow away from said vessel onto or above the surface of said ocean, said vessel having a gallery enclosed by walls mounted on its main deck and extending substantially from stem to stern, said walls including two spaced-apart walls that extend longitudinally, a first of said walls having a surface facing to the port side of said vessel and a second of said walls having a surface facing to the starboard side of said vessel, said devices being fixed in and through at least one of said walls in an array extending substantially the full length thereof, said devices being oriented to project said artificial snow away from said surface thereof.

3. A vessel according to claim 2 in which a first plurality of said devices is fixed in and through said first of said walls oriented to project said artificial snow to the port side of said vessel and a second plurality of said devices is fixed in and through said second of said walls oriented to project said artificial snow to the starboard side of said vessel.

* * * * *

UNITED STATES PATENT AND TRADEMARK OFFICE
CERTIFICATE OF CORRECTION

PATENT NO. : 8,161,757 B2  
APPLICATION NO. : 12/141161  
DATED : April 24, 2012  
INVENTOR(S) : Alfred Rosen Page 1 of 1

It is certified that error appears in the above-identified patent and that said Letters Patent is hereby corrected as shown below:

Column 4, Claim 1, Line 21 replace the text "stern to stern-" with "stem to stern-".

Column 4, Claim 1, Line 23 replace the text "stem to stem-" with "stem to stern-".

Signed and Sealed this  
Third Day of July, 2012

David J. Kappos  
*Director of the United States Patent and Trademark Office*